US006406343B2

(12) United States Patent
Kawai et al.

(10) Patent No.: US 6,406,343 B2
(45) Date of Patent: Jun. 18, 2002

(54) TILLER CONTROL FOR OUTBOARD MOTOR

(75) Inventors: Takaji Kawai; Hiroyuki Tsunekawa, both of Hamamatsu (JP)

(73) Assignee: Sanshin Kogyo Kabushiki Kaisha (JP)

( * ) Notice: Subject to any disclaimer, the term of this patent is extended or adjusted under 35 U.S.C. 154(b) by 0 days.

(21) Appl. No.: 09/491,862

(22) Filed: Jan. 26, 2000

(30) Foreign Application Priority Data

Jan. 26, 1999 (JP) .......................................... 11-016699

(51) Int. Cl.[7] ............................................... B60K 41/00
(52) U.S. Cl. .......................... 440/86; 74/483 R; 440/87
(58) Field of Search .................. 440/86, 87; 74/483 R; 477/112, 113

(56) References Cited

U.S. PATENT DOCUMENTS 2,635,576 A * 4/1953 Kiekhaefer .................. 440/86
3,317,012 A * 5/1967 Heidner et al. ............... 440/86
5,314,362 A 5/1994 Nagahora
5,421,755 A * 6/1995 Kakizaki ..................... 440/87
5,545,064 A 8/1996 Tsunekawa et al.
5,692,931 A 12/1997 Kawai

* cited by examiner

*Primary Examiner*—Sherman Basinger
(74) *Attorney, Agent, or Firm*—Knobbe, Martens Olson & Bear LLP

(57) ABSTRACT

An outboard motor features a compact throttle control and transmission shifting control on a handle connected to a tiller. An interlock is designed to limit the maximum engine speed at which the engine can be operated when in the transmission is in neutral and to lock the transmission in neutral or out of neutral when the engine is operated at a speed greater than a second speed that is less than the maximum speed.

28 Claims, 6 Drawing Sheets

TILLER CONTROL FOR OUTBOARD MOTOR

RELATED CASES

This application is based on Japanese Patent Application No. 11-016,699, filed on Jan. 26, 1999, the entire contents of which is hereby expressly incorporated by reference.

BACKGROUND OF THE INVENTION

1. Field of the Invention

The present invention generally relates to a control for an outboard motor. More specifically, the present invention relates to an improved tiller mounted throttle and transmission control for such a motor.

2. Related Art

In order to facilitate the operation of an outboard motor, a pivotally supported handle that contains controls for operating a throttle and a transmission of the motor is attached to an end of a tiller. The handle, whether as an add-on accessory or as original equipment, offers considerable ease of operation. For instance, both the throttle and the transmission control are connected to appropriate portions of the outboard motor such that the throttle controls the engine speed and the transmission control controls the engagement of the transmission. Accordingly, the controls are arranged conveniently close to each other.

U.S. Pat. No. 5,545,064, issued to Tsunekawa et al., disclosed a shift interlock that sought to prevent the operator from shifting the transmission into neutral (i.e., from forward to neutral, reverse to neutral, etc.) when the engine was operating at a high rate of speed. As disclosed therein, attempting such transmission shifts when the engine was running at a high rate of speed not only placed large loads on the clutch and gear mechanism of the transmission, but also could have caused sudden changes in watercraft movement that might have been disconcerting to its occupants.

SUMMARY OF THE INVENTION

With reference now to FIG. 1, a perspective view of a transmission-throttle interlock mechanism is illustrated therein. The illustrated interlock 10 is similar in some respects to that illustrated in FIG. 11 of U.S. Pat. No. 5,545,064. As illustrated, the interlock 10 generally comprises a cam 12 and a cam plate 14 that are brought into engagement under select conditions. The cam 12 is attached to a throttle control shaft 16 that is rotated to increase engine speed. As the illustrated throttle control shaft 16 is rotated in a counterclockwise manner, the cam 12 is rotated toward the cam plate 14. The cam plate 14 is attached to a transmission shift lever 18 in any suitable manner. As the transmission shift lever 18 is moved between positions that correspond to positions for forward, reverse and neutral gear selections (indicated by arrow and F, R and N designations), the cam plate 14 is moved with the lever. When the transmission is positioned in the neutral position, the cam plate 14 limits the range of movement of the throttle control shaft 16 using a stopping surface 20 and when the transmission is positioned in the drive or reverse positions, the cam 12 does not contact the illustrated cam plate. Thus, the interaction of the cam 12 and the stopping surface of the cam plate 14 limit the speed at which the engine can be run with the engine in the neutral position but not in the drive or reverse positions.

The illustrated interlock 10, however, suffers from at least one drawback. While the interlock 10 limits engine speed when the transmission is in the neutral position, the interlock 10 does not regulate shift operation. For instance, if the engine speed is high enough, the interlock does not prevent movement of the transmission shift lever from a drive condition into the neutral position. In fact, in the illustrated arrangement, such a movement of the transmission shift lever could result in the throttle being stuck in a high speed position until the transmission is again shifted into a drive position and the throttle angle is decreased. In addition, the illustrated interlock allows the transmission to be slid into gear from the neutral position even with the throttle cam pegged against the stopping surface. Thus, a shift interlock is desired that would limit shifting to conditions. For instance, engine speed should be decreased before shifting is undertaken.

Accordingly, one aspect of the present invention involves an outboard motor comprising a tiller and a handle that is connected to the tiller and that comprises a housing. A throttle control shaft extends generally longitudinally through the housing and rotates about a generally longitudinally extending rotational axis. A cam is repositionably secured to the shaft. A transmission control lever is pivotally attached to the housing with the lever pivoting about a generally transverse axis. A cam plate is fixed to the lever for pivotal movement with the lever. The cam plate includes a pair of generally parallel ribs and a stopping surface that is interposed between the ribs. The cam and the stopping surface are arranged to contact when the shaft is in a first preselected angular shaft position and the transmission control lever is in a first preselected transmission position. The cam is secured in position between the ribs when the shaft is in the first preselected angular shaft position such that the cam plate and the lever are held in the first preselected transmission position.

Another aspect of the present invention involves an outboard motor tiller control comprising a handle housing assembly adapted to be attached to a tiller of an outboard motor. A throttle control shaft is journaled within the housing for rotation about a generally longitudinally extending rotational axis and a transmission shifting control lever is supported for pivotal movement relative to the handle housing assembly about a generally transversely extending pivot axis. Means are provided for selectively interlocking the shifting control lever and the throttle control shaft such that the shifting control lever is locked in a first preselected pivotal position when the throttle control shaft is rotated to a first preselected angular position.

A further aspect of the present invention involves an outboard motor tiller control comprising a handle housing assembly adapted to be attached to a tiller of an outboard motor. A throttle control shaft is journaled within the housing for rotation about a generally longitudinally extending rotational axis and a transmission shifting control lever is supported for pivotal movement relative to the handle housing assembly about a generally transversely extending pivot axis. A means is provided for selectively interlocking the shifting control lever and the throttle control shaft such that the shifting control lever is locked out of a first preselected pivotal position when the throttle control shaft is rotated to a first preselected angular position.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures.

DETAILED DESCRIPTION OF THE PREFERRED EMBODIMENT OF THE INVENTION

Figure 1:
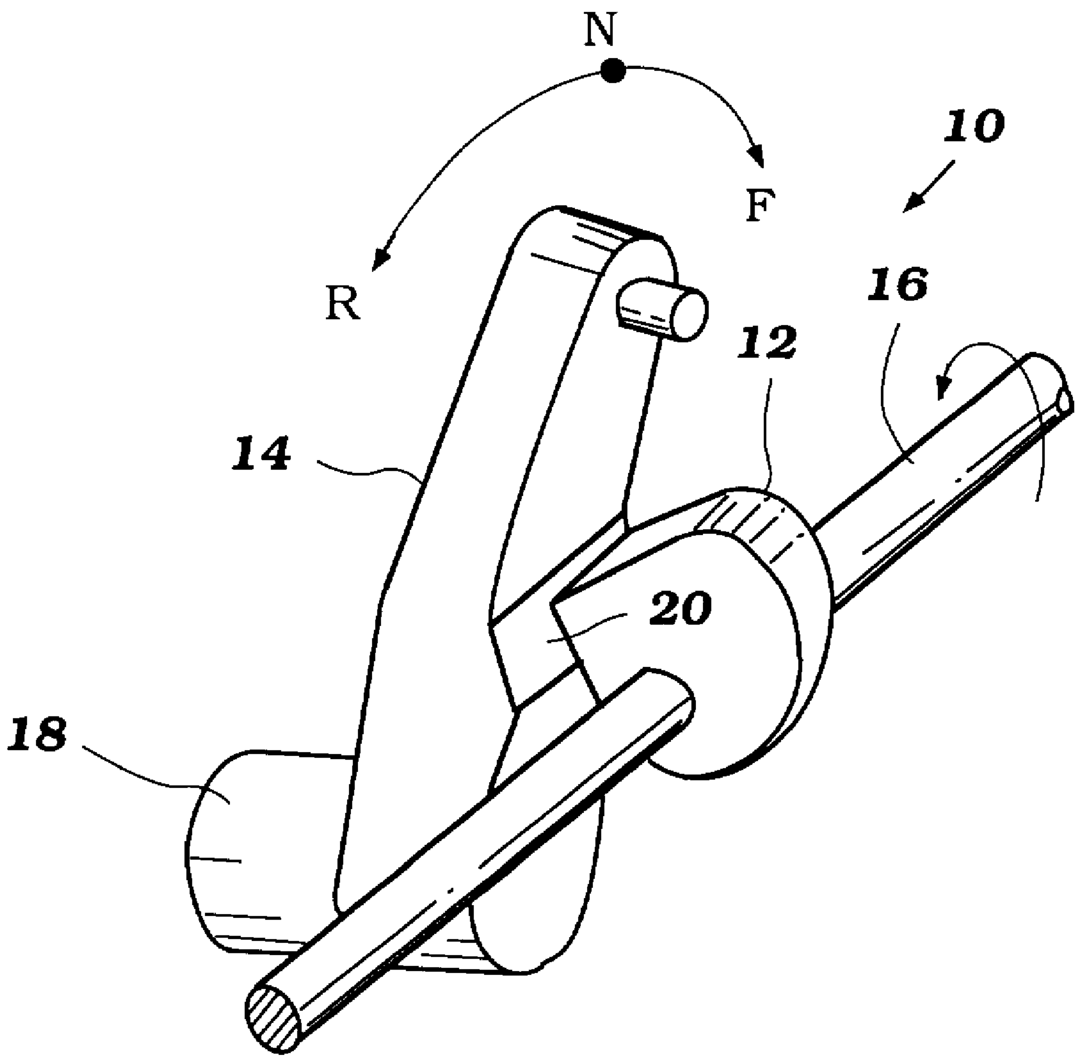
Figure 1 Prior Art
FIG. 1 is a perspective view of a transmission-throttle interlock discussed above.
Figure 2:
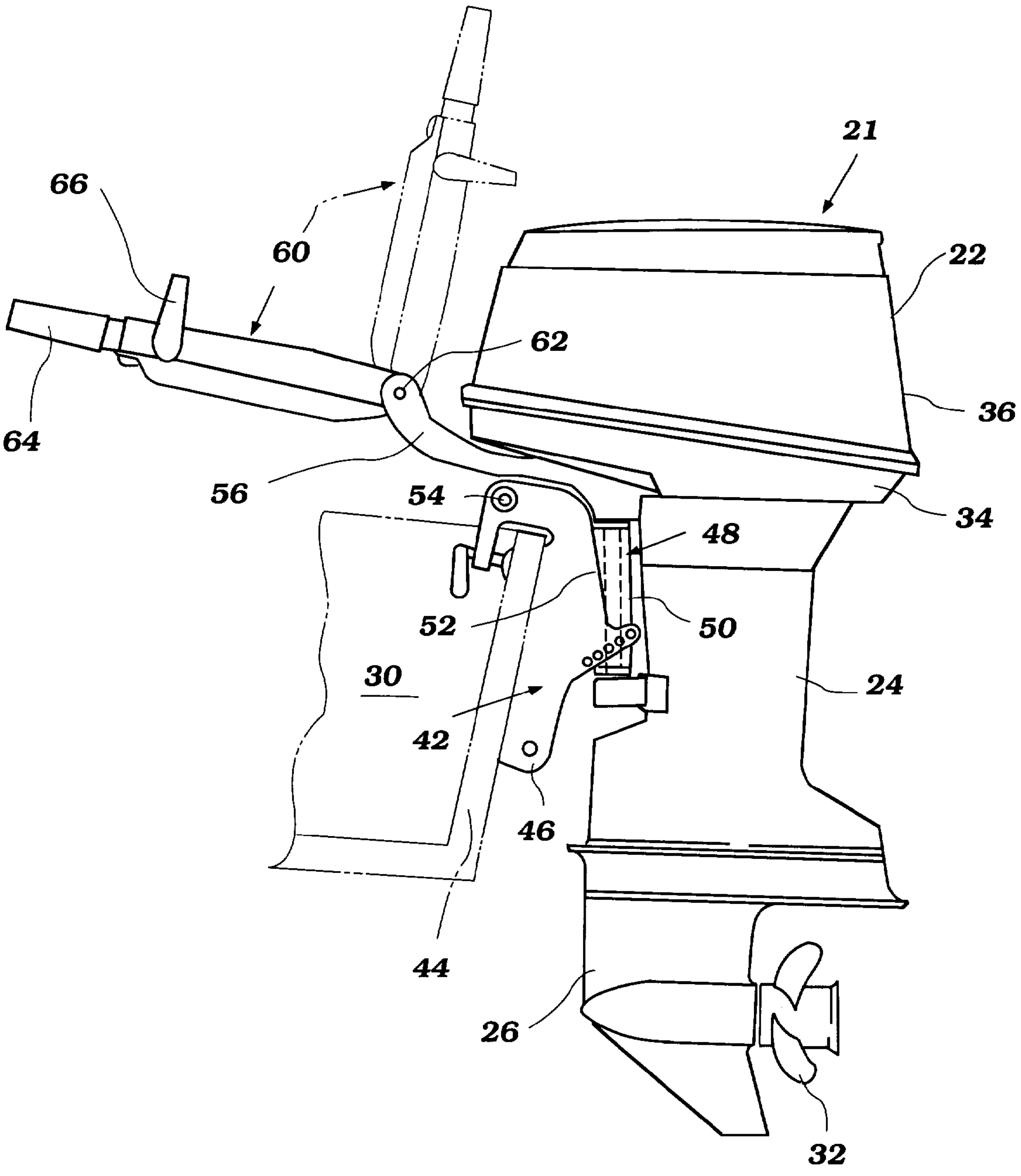
FIG. 2 is a side elevation view of an outboard motor constructed in accordance with certain features, aspects and advantages of the present invention and having a control mechanism shown in its operative position in solid lines and in its storage position in phantom lines.

With reference now to FIG. 2, an outboard motor constructed in accordance with certain features, aspects and advantages of the present invention is illustrated therein and indicated by the reference numeral 21. The present invention generally involves selectively interlocking and selectively preventing the interlocking of the throttle control and the transmission shift control to reduce the likelihood of undesirable shifting during high speed engine operation.

The illustrated outboard motor 21 generally comprises a powerhead 22, a driveshaft housing 24, and a lower unit 26. The powerhead 22 preferably includes an internal combustion engine (not shown) that is used to power a watercraft 30 to which the outboard motor is mounted. The mid section or driveshaft housing 24 extends downward below the powerhead 22 and contains portions of an exhaust system associated with the engine as well as a driveshaft as is well known to those of ordinary skill in the art. The lower unit 26 typically includes a transmission and journals a propulsion shaft that drives a propeller 32.

The powerhead 22 generally includes a protective cowling which surrounds the engine (not shown). The cowling generally comprises both a lower tray portion 34 and an upper main cover portion 36. Typically, the main cover portion 36 is hingedly connected to the lower tray portion 34, or otherwise removably affixed to the lower tray portion 34, such that the engine may be accessed by removing the main cover portion 36 from the lower tray portion 34. In addition, the joint between the lower tray portion 34 and the main cover portion 36 preferably is provided with a seal or other type of watertight connection such that water infiltration can be reduced or minimized. Such a construction results in improved protection of the engine from undesired ingestion of water during operation.

As mentioned above, the lower unit 26 preferably includes a transmission to transfer power from a driveshaft to the impeller or propeller 32. Preferably, the transmission is a forward/neutral/reverse type transmission. This type of transmission enables the watercraft to be driven in any of these operational states. The transmission selectively establishes a driving condition of the propeller 32. Of course, as will be recognized by those of ordinary skill in the art, the propeller 32 can be replaced by any other known or suitable propulsion device. For instance, but without limitation, the propulsion device 32 could be jet pump unit.

As is generally known to those of ordinary skill in the art, the present outboard motor 21 can be attached to the watercraft 30 using a clamp and swivel bracket 42. As illustrated, the clamp and swivel bracket 42 is configured to attach the outboard motor 21 to the watercraft 30 along a transom or rear wall 44. The bracket 42 enables the motor 21 to be both steered about a generally vertical axis and tilted or trimmed about a generally horizontal axis. The bracket 42, therefore, includes a clamping portion 46 and a swivel portion 48. The swivel portion 48 generally comprises a swivel bracket 50 and a swivel shaft 52. In addition, the bracket 42 allows the motor 21 to be tilted about a tilt pin 54. As each of these constructions is well-known to those of ordinary skill in the art, further description is unnecessary to enable such a person to make and use the present invention. In addition, a tiller 56 is attached to the upper end of the swivel bracket 50 and is for steering of the outboard motor 21 in a manner well known to those of ordinary skill in the art.

The construction of the outboard motor 21 as thus far described may be considered to be conventional and since the invention deals primarily with a control handle assembly and interlock mechanism, indicated generally by the reference numeral 60, further description of the outboard motor 21 is not believed to be necessary. Where any portion of the outboard motor 21 has not been described, such portion should be considered conventional.

The illustrated control handle 60 is pivotally connected to the end of the tiller 56 with a pivot pin 62 so that the control handle 60 can be pivoted between its operative position and a storage position. The operative position generally corresponds to that shown in solid lines in FIG. 2 while the storage position generally corresponds to that shown in phantom lines in FIG. 2. As will be described in more detail below, the illustrated handle 60 also comprises a twist grip throttle control 64 and a pivotally supported transmission control 66.

Figure 3:
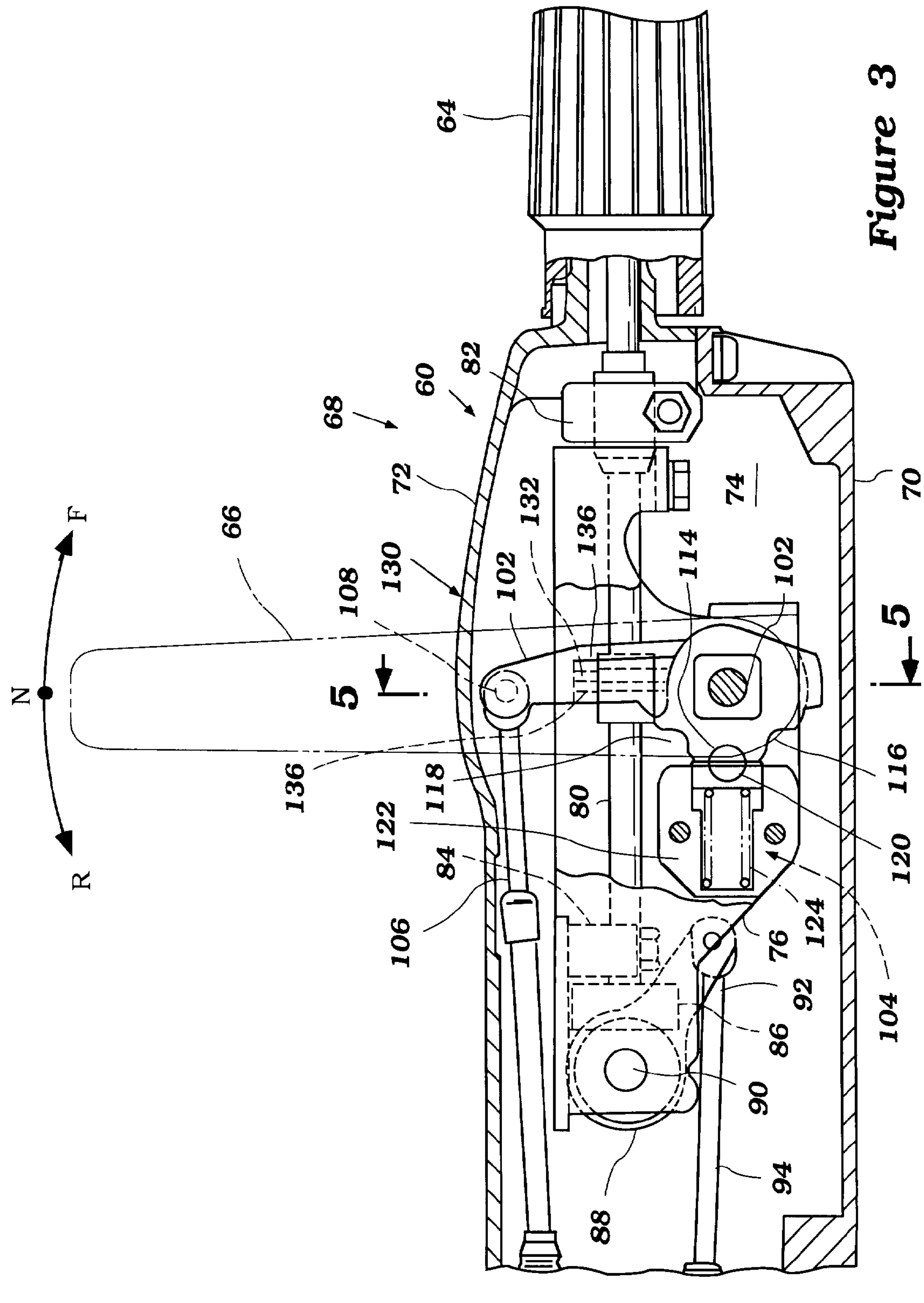
FIG. 3 is a partial side elevation view of the control mechanism with a portion of a housing assembly broken away to more clearly show the construction.
Figure 4:
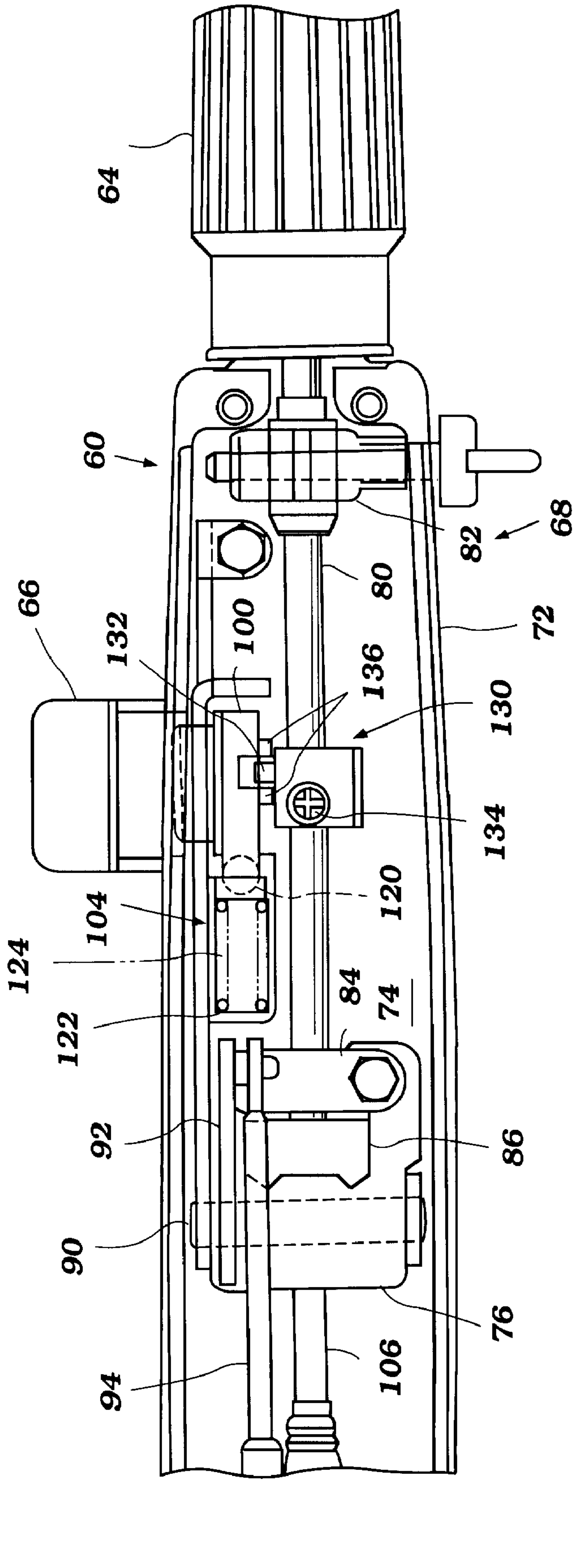
FIG. 4 is a partial top plan view of the control mechanism with a portion of a housing assembly broken away to more clearly show the construction.
Figure 5:
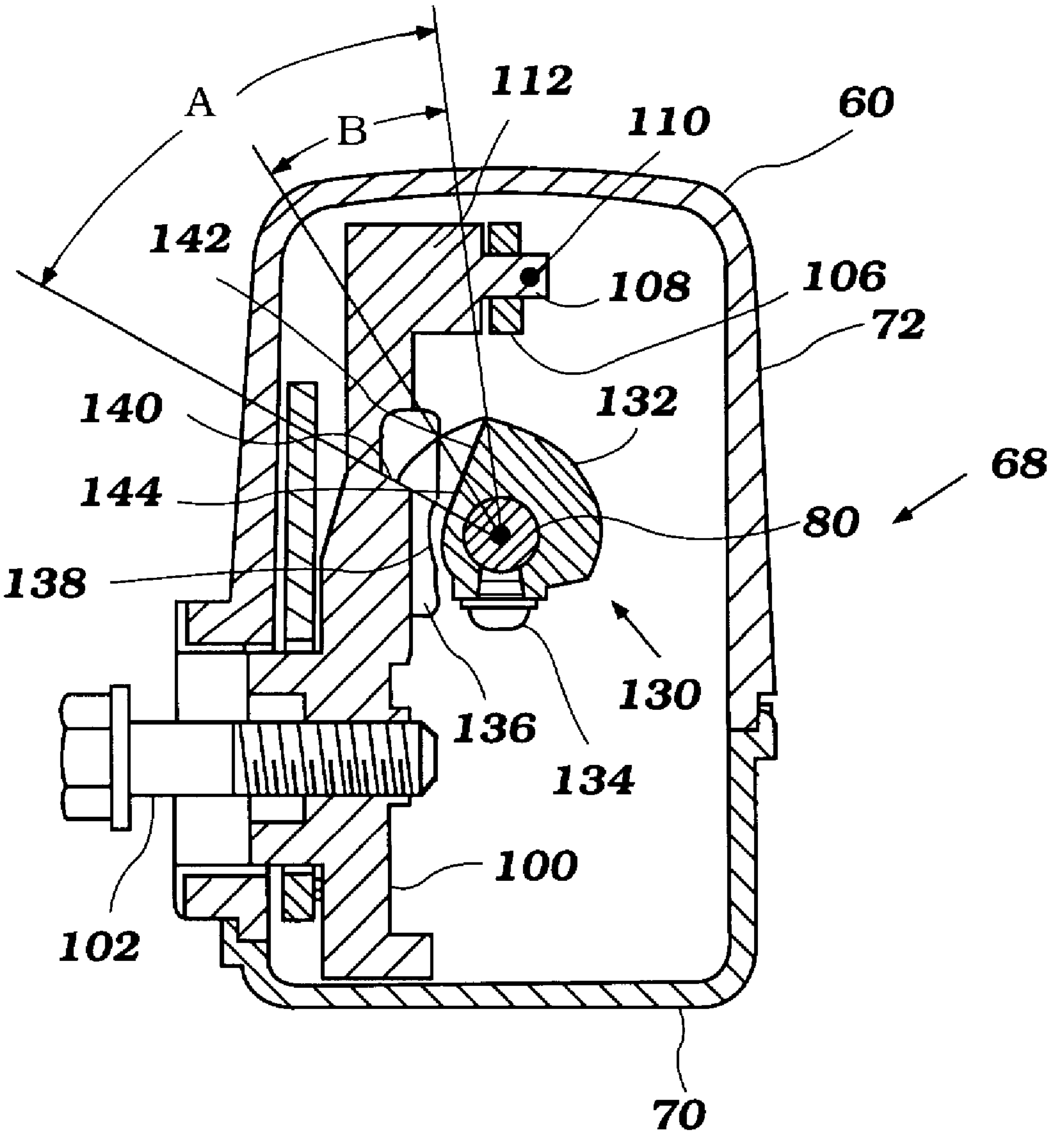
FIG. 5 is a sectioned view of the control mechanism taken along the line 5—5 in FIG. 3.
Figure 6:
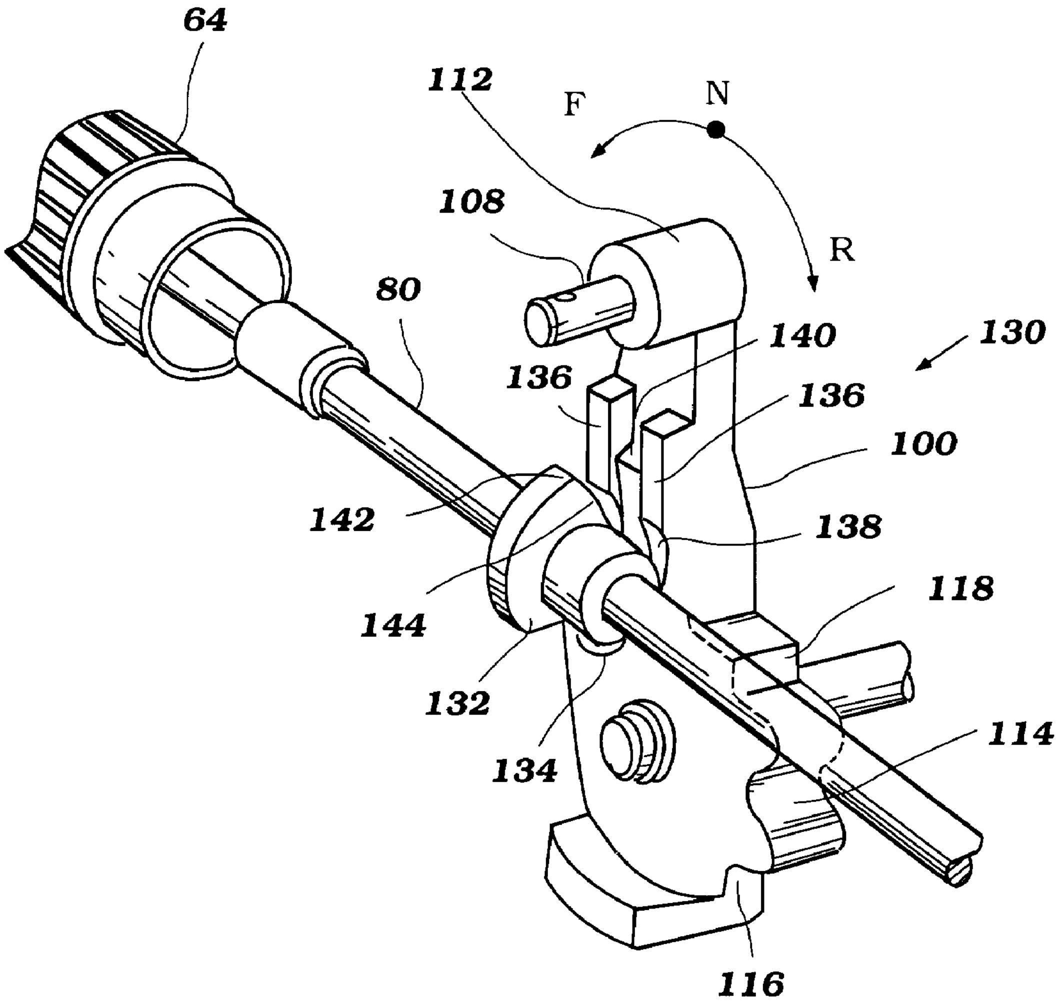
FIG. 6 is a perspective view illustrating the interaction of the control mechanism of FIG. 3.

With reference now to FIGS. 3–5, the control handle 60 generally comprises a main housing assembly, generally indicated by the reference numeral 68, which generally includes two interconnected outer housing parts, 70, 72. These two parts 70, 72 are connected in a suitable manner and define an internal cavity 74 in which certain mechanisms, to be described, are contained.

For instance, a frame member 76 is positioned within the cavity 74. The frame member 76 is attached to the outer housing parts 70, 72 in any suitable manner. The balance of the illustrated interlock, throttle control and transmission control preferably is mounted to the frame member 76; however, other mounted arrangements are also contemplated.

The throttle control mechanism includes the twist grip throttle control 64 that an operator of the engine grasps not only to steer the outboard motor 21 but also to change the speed of the engine. This twist grip throttle control 64 is connected to a throttle control shaft 80 that is journaled by a first bearing 82 and a second bearing 84 in a suitable manner. The twist grip throttle control 64 can be connected to the throttle control shaft 80 in any suitable manner.

With reference to FIGS. 3 and 4, a bevel gear 86 is secured to the illustrated shaft 80 on the end opposite of the grip 64. The illustrated bevel gear is enmeshed with a driven bevel gear 88 that is journaled on a stub shaft 90. The stub shaft 90 is also affixed to the frame 76 along a side leg in the illustrated embodiment. As should be readily apparent, rotation of the shaft 80 in one direction will cause rotation of the driven bevel gear 88 in one direction and rotation of the shaft 80 in the other direction will cause rotation of the driven bevel gear 88 in the other direction. In addition, the gear 88 is connected to an extending arm portion 92 that is connected to a throttle cable 94. Thus, movement of the shaft 80 results in movement of the throttle cable 94. As will be recognized by those of ordinary skill in the art, movement of the throttle cable 94 results in movement of a throttle valve of the engine through any suitable mechanism.

The transmission control generally comprises the control lever 66 and a cam plate 100. As has been discussed above, the control lever 66 operates the transmission control and effectively controls movement of a dog clutch arrangement that selectively engages a forward, neutral, reverse type transmission with a shaft connected to the propeller 32. With reference to FIG. 5, the illustrated lever 66 (not shown in FIG. 5) is drivingly connected to the cam plate 100 by a bolt 102. Of course, the lever 66 could also be connected to the cam plate 100 in any other suitable manner, including other threaded and non-threaded fasteners, welding and the like.

The pivot axis defined by the bolt 102 extends generally transverse to the longitudinal axis of rotation of the throttle shaft 80. In fact, in some arrangements, these axes intersect and lie in a common plane, however, in the illustrated arrangement, the transmission lever pivot axis is located vertically lower than the throttle shaft axis. Such an arrangement ensures that a détente transmission position lock 104, which will be discussed below, has adequate room for placement and movement.

The illustrated cam plate 100 is threadedly attached to the inner end of the bolt 102. or stub shaft, as best shown in FIG. 5. The cam plate 100 includes a lever arm 112 to which one end of a transmission control link 106 is pivotally connected. The link 106 is preferably pinned in position using a pin 108 and cotter pin 110 combination. Of course, any other suitable fastening arrangement can also be used. In addition, the lever arm 112 desirably places the throttle shaft axis and the link 106 in substantially the same vertically extending longitudinal plane, as best shown in FIG. 5. The other end of the transmission control link 106 is operatively connected to a transmission operating arrangement that is well known to those of ordinary skill in the art.

As introduced above, the lever 66 can be releasably retained in various positions by the détente transmission position lock 104. The lock 104 releasably retains the transmission control lever, and therefore the transmission, in at least the neutral, forward and reverse positions as indicated by the letters N, F and R, respectively. To this end, the cam plate 100 comprises a neutral concavity 114, a forward cavity 116 and a reverse cavity 118. A détente ball 120 is contained within a ball supporting assembly 122 and is biased by a biasing member 124, such as a spring, for instance. The ball 120 is resiliently biased into engagement with the recesses 114, 116, 118 so as to releasably retain the transmission control lever 66 in each of the illustrated three positions. The ball is pushed against the biasing force of the spring as the lever moves between each of the positions and the ball is returned into the recesses as each comes in line with the travel path of the ball. Of course, more or less positions have also been contemplated. Such a lock arrangement helps reduce the likelihood of accidental or unexpected transmission shifting. In addition, such a lock arrangement eases the operation of the motor.

The transmission control and the throttle control are interconnected by a selective interlock assembly 130. Basically, the interlock 130 functions to preclude the running of the engine at greater than predetermined speeds when the transmission is in neutral and to retard or prevent the shifting of the transmission through or into neutral when the engine is running at greater than a predetermined speed. More preferably, the interlock requires the engine to be running at a speed less than the highest allowed neutral engine speed before the transmission is shifted into or out of neutral. More preferably, and unlike the prior art, the interlock 130 does not permit the operator to shift the transmission into neutral under an emergency condition by applying sufficient force and, when this is attempted, the throttle control will not be reduced to a speed no greater than the predetermined permission speed at neutral. In other words, the interlock most preferably cannot be overriden by brute force in some arrangements. In addition, and also unlike the prior art, the interlock 130 preferably positively secures the transmission in neutral at the highest permissible speed and preferably requires that the engine speed actually be reduced below the highest permissible speed prior to being shifted out of neutral.

The interlock assembly 130 includes a cam 132 that is fixed for rotation with the throttle shaft 80. The cam 132, as used herein, also refers to fingers, protuberances, bosses, linkages, cam members, and the like. The cam 132 desirably is removably fixed for rotation by a setscrew 134 or similar type of arrangement. Of course, other suitable methods of adjustably fixing the cam 132 in position along the shaft 80 can also be used. In some arrangements, the cam is integrally formed with the shaft. Preferably, the positioning of the cam 132 can be adjusted both angularly about the shaft 80 and longitudinally along the shaft 80. Such adjustability is desirable to allow the interlock assembly to be fine tuned both for proper operation and for adjusting the highest permissible speed and shifting speed.

The cam plate 100 is attached to the lever 66 as discussed above. Of course, the cam plate can also be interconnected with the lever 66 using any suitable linkage, if necessary; however, the illustrated arrangement is advantageously simple and compact in structure. The cam plate is positioned such that the cam plate 100 and the cam 132 can come into contact at a stopping surface 140 when the transmission is positioned in neutral. The cam plate also includes at least two substantially parallel ribs 136 that extend away from a surface of the cam plate 100 towards the shaft 80. The ribs 136 also desirably include a contoured central portion.138 that is so designed for reasons that will become apparent. While the illustrated ribs are formed integrally with the cam plate, they could be separately formed or they could be made to be adjustable. Adjusting the ribs could be used to vary the degree to while the engine speed is reduced prior to shifting the transmission from motor to motor. In some applications, the ribs could be pins, protrusions, bosses, non-parallel ribs, interrupted or segmented members, shoulders or any other suitable structure defining a valley or similar structure. Moreover, in some applications, a single rib can be used to obstruct shifting in a single direction when the engine is at the highest permissible speed. Furthermore, the ribs can extend a differing amount from the cam surface in some applications such that the throttle angle associated with allowing shifting varies when shifting between neutral and reverse and between neutral and forward.

When the transmission is in neutral, and the lever 66 is therefore in the neutral position, the shaft 80, and therefore the cam 132, can rotate an angle A before the cam 132 contacts the stopping surface 140. Once the cam 132 and the stopping surface 140 are in contact, further rotation of the shaft 80 in the direction of accelerating the engine preferably is prevented by the interlock 130. Thus, the highest permissible speed is limited by the combination of the positioning of the stopping surface 80 and the angular position of the cam 132 relative to the throttle shaft 80. As will be recognized by those of ordinary skill in the art, the illustrated interlock 130 allows this highest permissible speed to be adjusted through changing the angular position of the cam 132 relative to the throttle shaft 80. It is anticipated, of course, that the adjustability can also result from a moveable stopping surface 140.

When the operator desires to move the transmission into, out of or through the neutral position, and therefore move the lever 66 into, out of or through the neutral position, the engine speed must be below the highest permissible speed defined by throttle shaft position A. More particularly, in the illustrated arrangement, the angular position of the throttle shaft should be reduced to be no more than B, which is the angular position of the throttle shaft 80 at which the cam 132 can be moved into or from within the area defined between the two ribs 136. In some arrangements, the contoured portions 138 of the ribs 136 allow a portion of the cam to slide past the ribs while allowing the axis of rotation of the cam to be placed closer to a plane defined by motion of the cam plate 100. Preferably, the angle B is defined to correspond to a speed that is gentle on the transmission and does not result in sudden and unexpected movement of the boat to which the motor 21 is attached. Once the throttle shaft position, and therefore the throttle position and the engine speed, is sufficiently reduced, the lever 66 can be used to select a drive gear (i.e., forward or reverse) and the throttle shaft, and therefore the throttle position, can be varied from closed to fully opened.

With reference to FIG. 5, the angles A and B are illustrated. Preferably, the angle B can be varied depending upon the contour of the cam 132 and the ribs 136. in the illustrated arrangement, the angle B is the angle at which a tip 142 of the cam 132 can pass from within the area defined by the ribs 136. The angle B can also be defined as a rotational angle at which a side surface, such as that shown at 144, can slide from within the same area. Such a construction involves increasing the degree of interfering surface area and provides a construction less likely to be overcome by brute force. Of course, in some arrangements, the possibility to overcome the interlock by brute force (which then automatically decreases engine speed as the throttle shaft 88 turns due to forces exerted on the transmission lever) is desirable and the tip construction or even a tapered profile cam surface could be used. As used herein, a tapered profile cam surface is a three-dimensional cam surface rather than a two-dimensional cam surface. For instance, the cam surface of a two-dimensional cam surface is flat from one side to the other while the cam surface of a three-dimensional cam surface varies across its thickness.

As will be recognized by those of ordinary skill in the art, the present construction of the interlock is advantageously simple. The illustrated construction, with its square edges, almost requires that the engine speed be reduced before shifting into or out of neutral. The pocket defined between the illustrated ribs acts to positively secure the transmission in neutral when the engine speed is sufficiently high. In addition, the construction of the illustrated cam plate forms a positive limit to the engine speed while the transmission is positioned in neutral. Accordingly, the illustrated interlock reduces the likelihood of shifts into or out of neutral or through the neutral range while the engine is operating at high speeds. Such a construction reduces engine and transmission wear over a period of time and reduces the likelihood of transmission failure due to high speed shifts.

Although the present invention has been described in terms of a certain embodiment, other embodiments apparent to those of ordinary skill in the art also are within the scope of this invention. Thus, various changes and modifications may be made without departing from the spirit and scope of the invention. For instance various components may be repositioned as desired. In addition, the cam plate could have a single boss that cooperated with a corresponding groove formed in the cam. Moreover, not all of the features, aspects and advantages are necessarily required to practice the present invention. Accordingly, the scope of the present invention is intended to be defined only by the claims that follow.

What is claimed is:

1. An outboard motor comprising a tiller, a handle connected to said tiller, said handle comprising a housing, a throttle control shaft extending generally longitudinally through said housing and rotating about a generally longitudinally extending rotational axis, a protruding member being positioned on said shaft and rotating with said shaft, a transmission control lever being pivotally attached to said housing, said lever pivoting about a generally transverse axis, a plate being fixed to said lever for pivotal movement with said lever, said plate including a pair of generally parallel ribs and a stopping surface interposed between said ribs, said protruding member and said stopping surface being arranged for contact when said shaft is in a first preselected angular shaft position and said transmission control lever is in a first preselected transmission position corresponding to neutral, said protruding member being secured in position between said ribs when said shaft is in said first preselected angular shaft position such that said plate and said lever is held in said first preselected transmission position.

2. The outboard motor of claim 1, wherein the protruding member is angularly repositionable on said shaft to alter an interrelationship between the protruding member and the plate.

3. The outboard motor of claim 1, wherein the protruding member is axially repositionable on said shaft to alter an interrelationship between the protruding member and the plate.

4. The outboard motor of claim 1, wherein said first preselected transmission position corresponds to a neutral position of a transmission associated with the outboard motor.

5. The outboard motor of claim 1, wherein said transmission control lever is capable of pivotal movement when said throttle shaft is moved to a second preselected angular shaft position that is less than said first preselected angular shaft position.

6. The outboard motor of claim 5, wherein said second preselected angular shaft position is greater than a third preselected angular shaft position associated with a closed throttle valve.

7. The outboard motor of claim 5, wherein said second preselected angular shaft position corresponds to a position in which a tip of said protruding member can clear at least one of said ribs.

8. The outboard motor of claim 7, wherein said second preselected angular shaft position corresponds to a position in which a tip of said protruding member can clear both of said ribs.

9. The outboard motor of claim 5, wherein said second preselected angular shaft position corresponds to a position in which a side of said protruding member can clear at least one of said ribs.

10. The outboard motor of claim 9, wherein said second preselected angular shaft position corresponds to a position in which a side of said protruding member can clear both of said ribs.

11. The outboard motor of claim 1, wherein both of said ribs extend substantially the same distance from said plate.

12. The outboard motor of claim 1, wherein said lever is capable of pivotal movement to both sides of a transversely extending plane that is defined through said protruding member.

13. The outboard motor of claim 1, wherein each of said ribs have an uninterrupted construction.

14. The outboard motor of claim 1, wherein said protruding member has a flat surface such that said protruding member cannot be forcefully urged into position between said ribs when said lever is in a position other than said first preselected position when said shaft is in said first preselected angular shaft position.

15. An outboard motor tiller control comprising a handle housing assembly adapted to be attached to a tiller of an outboard motor, a throttle control shaft being journaled within said housing for rotation about a generally longitudinally extending rotational axis, a transmission shifting control lever being supported for pivotal movement relative to said handle housing assembly about a generally transversely extending pivot axis, and means for selectively interlocking said shifting control lever and said throttle control shaft such that said shifting control lever is locked in a first preselected pivotal position when said throttle control shaft is rotated to a first preselected angular position, said means being positioned within said handle housing assembly.

16. The outboard motor tiller control of claim 15, wherein said throttle control shaft cannot be rotated beyond a second preselected angular position that is larger than said first preselected angular position when said shifting control lever is in said first preselected pivotal position.

17. The outboard motor tiller control of claim 16 further comprising a throttle stop that limits an angular displacement of said throttle control shaft when said shifting control lever is in said first preselected pivotal position.

18. The outboard motor tiller control of claim 15, wherein said first preselected angular position corresponds to a neutral transmission arrangement.

19. An outboard motor tiller control comprising a handle housing assembly adapted to be attached to a tiller of an outboard motor, a throttle control shaft being journaled within said housing for rotation about a generally longitudinally extending rotational axis, a transmission shifting control lever being supported for pivotal movement relative to said handle housing assembly about a generally transversely extending pivot axis, and means for selectively interlocking said shifting control lever and said throttle control shaft such that said shifting control lever is locked out of a first preselected pivotal position when said throttle control shaft is rotated to a first preselected angular position, said means being positioned within said handle housing assembly.

20. The outboard motor tiller control of claim 19, wherein said throttle control shaft cannot be rotated beyond a second preselected angular position that is larger than said first preselected angular position when said shifting control lever is in said first preselected pivotal position.

21. The outboard motor tiller control of claim 20 further comprising a throttle stop that limits an angular displacement of said throttle control shaft when said shifting control lever is in said first preselected pivotal position.

22. The outboard motor tiller control of claim 19, wherein said first preselected pivotal position corresponds to a neutral transmission arrangement.

23. An outboard tiller control comprising a handle housing adapted to be connected to an outboard motor, a throttle control shaft extending through at least a portion of the handle housing, said throttle control shaft being configured to rotate about a generally longitudinal axis, a transmission shifting lever adapted also to be connected to the outboard motor, said transmission shifting lever being configured to rotate about a generally transverse axis, a protruding member attached to said throttle control shaft and a receiving plate attached to said shifting lever, said protruding member and said receiving plate being positioned proximate each other, said protruding member capable of rotating into a portion of said receiving plate when said throttle control shaft is rotated, said receiving plate capable of shifting relative to said protruding member when said transmission shifting lever is moved and said protruding member capable of limiting shifting of said receiving plate when said protruding member contacts said portion of said receiving plate.

24. The tiller control of claim 23, wherein said receiving plate comprises a first rib and a second rib that extend substantially parallel to each other, a space being defined between said first rib and said second rib such that said first rib, said second rib and said space define three transmission operating positions.

25. The tiller control of claim 24, wherein a stopping surface is disposed within said space.

26. The tiller control of claim 25, wherein said protruding member is capable of rotating into contact with said stopping surface with rotation of said throttle control shaft such that a maximum angle of throttle control shaft rotation is defined.

27. The tiller control of claim 24, wherein said first rib comprises a first contoured contact surface that is positioned such that said protruding member can contact said first contoured contact surface.

28. The tiller control of claim 27, wherein said second rib comprises a second contoured contact surface that is positioned such that said protruding member can contact said second contoured contact surface.

* * * * *